US012749128B2

(12) United States Patent
Romney et al.

(10) Patent No.: US 12,749,128 B2
(45) Date of Patent: Sep. 29, 2026

(54) TECHNIQUES FOR AN AUTOMATED FUNDING PARTICIPATION BLOCKCHAIN SERVER

(71) Applicant: Capital Premium Financing, LLC, Draper, UT (US)

(72) Inventors: Todd H. Romney, Rancho Mission Viejo, CA (US); Scott L. Crowley, Orem, UT (US); Josef C. Heugly, Midway, UT (US); David F. Gabrielsen, Draper, UT (US)

(73) Assignee: CAPITAL PREMIUM FINANCING, LLC, Draper, UT (US)

( * ) Notice: Subject to any disclaimer, the term of this patent is extended or adjusted under 35 U.S.C. 154(b) by 0 days.

(21) Appl. No.: 18/479,657

(22) Filed: Oct. 2, 2023

(65) Prior Publication Data

US 2024/0112271 A1 Apr. 4, 2024

Related U.S. Application Data

(60) Provisional application No. 63/412,134, filed on Sep. 30, 2022.

(51) Int. Cl.
*G06Q 40/08* (2012.01)
*G06Q 20/02* (2012.01)

(52) U.S. Cl.
CPC ......... *G06Q 40/0822* (2025.08); *G06Q 20/02* (2013.01); *G06Q 40/08* (2013.01); *G06Q 40/082* (2025.08); *G06Q 40/086* (2025.08); *G06Q 2220/00* (2013.01)

(58) Field of Classification Search
CPC .. G06Q 40/08; G06Q 40/082; G06Q 40/0822; G06Q 40/086; G06Q 20/02
See application file for complete search history.

(56) References Cited

U.S. PATENT DOCUMENTS

| | | | | |
|---|---|---|---|---|
| 11,423,372 | B1 * | 8/2022 | Martinson | G07G 1/12 |
| 2019/0132203 | A1 * | 5/2019 | Wince | G06F 9/44505 |
| 2020/0184448 | A1 * | 6/2020 | Jain | G06Q 20/202 |
| 2020/0219186 | A1 * | 7/2020 | Zameni | G06Q 50/16 |
| 2021/0004907 | A1 * | 1/2021 | Hwang | G06Q 40/06 |
| 2021/0125282 | A1 * | 4/2021 | Saburi | G06Q 40/06 |
| 2022/0156727 | A1 * | 5/2022 | Yan | G06Q 20/02 |
| 2022/0188295 | A1 * | 6/2022 | Novotny | G06F 21/602 |
| 2022/0284419 | A1 * | 9/2022 | Tedesco | H04L 9/0643 |
| 2022/0301064 | A1 * | 9/2022 | Kim | G06Q 40/04 |

* cited by examiner

*Primary Examiner* — Scott C Anderson
(74) *Attorney, Agent, or Firm* — KNH LLP

(57) ABSTRACT

Apparatuses, methods, systems, and program products are disclosed for techniques for an automated funding participation blockchain server. An apparatus includes a processor and a memory coupled to the processor. The memory includes code that is executable by the processor to establish a smart contract between a first entity and a second entity, the second entity participating in a partnership with the first entity according to at least one rule defined in the smart contract, monitor a status of the second entity in relation to the terms of the smart contract, generate, using machine learning, at least one recommendation for adjusting the status of the second entity according to the at least one rule defined in the smart contract, and automatically adjust the status of the second entity according to the at least one recommendation.

20 Claims, 3 Drawing Sheets

TECHNIQUES FOR AN AUTOMATED FUNDING PARTICIPATION BLOCKCHAIN SERVER

CROSS REFERENCE TO RELATED APPLICATIONS

This application claims the benefit of U.S. Provisional Patent Application No. 63/412,134 entitled "APPARATUS, SYSTEM, AND METHOD FOR AN AUTOMATED INSURANCE AGENCY LOAN CONTRACT FUNDING PARTICIPATION BLOCKCHAIN SERVER" and filed on Sep. 30, 2022, for Todd Romney, et al., which is incorporated herein by reference in its entirety for all purposes.

FIELD

This invention relates to blockchain technology and more particularly relates to techniques for an automated funding participation blockchain server.

BACKGROUND

Smart contracts may be used to automate execution of an agreement. Smart contracts may utilize blockchain technology to store portions of the smart contract that run when certain conditions are met.

BRIEF SUMMARY

Apparatuses, methods, systems, and program products are disclosed for techniques for an automated funding participation blockchain server. In one embodiment, an apparatus includes a processor and a memory coupled to the processor. The memory, in one embodiment, includes code that is executable by the processor to establish a smart contract between a first entity and a second entity, the second entity participating in a partnership with the first entity according to at least one rule defined in the smart contract, monitor a status of the second entity in relation to the terms of the smart contract, generate, using machine learning, at least one recommendation for adjusting the status of the second entity according to the at least one rule defined in the smart contract, and automatically adjust the status of the second entity according to the at least one recommendation.

In one embodiment, a method includes establishing a smart contract between a first entity and a second entity, the second entity participating in a partnership with the first entity according to at least one rule defined in the smart contract, monitoring a status of the second entity in relation to the terms of the smart contract, generating, using machine learning, at least one recommendation for adjusting the status of the second entity according to the at least one rule defined in the smart contract, and automatically adjusting the status of the second entity according to the at least one recommendation.

In one embodiment, an apparatus includes means for establishing a smart contract between a first entity and a second entity, the second entity participating in a partnership with the first entity according to at least one rule defined in the smart contract, means for monitoring a status of the second entity in relation to the terms of the smart contract, means for generating, using machine learning, at least one recommendation for adjusting the status of the second entity according to the at least one rule defined in the smart contract, and means for automatically adjusting the status of the second entity according to the at least one recommendation.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
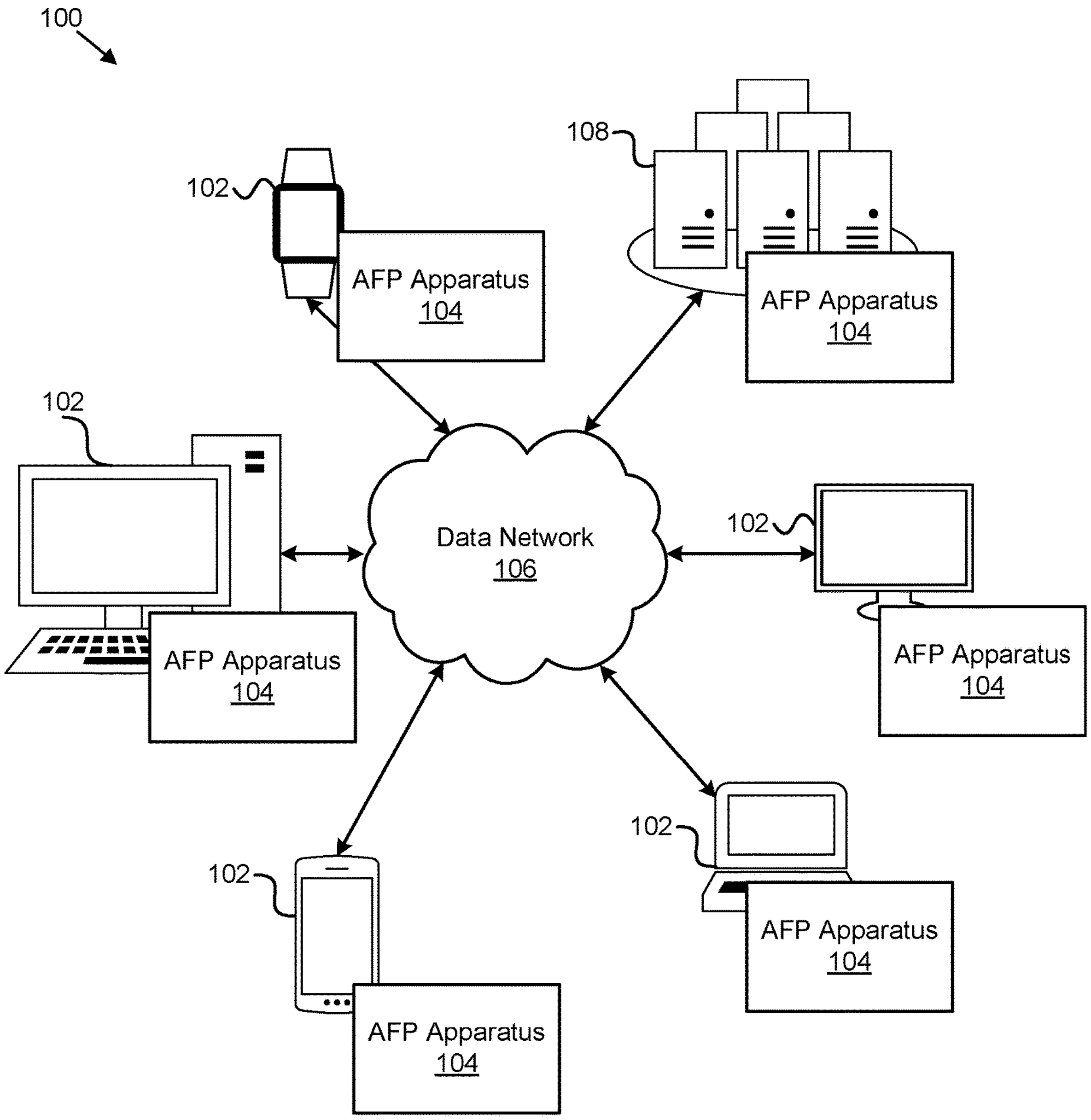
FIG. 1 is a schematic block diagram illustrating one embodiment of a system for techniques for an automated funding participation blockchain server.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Apparatuses, methods, systems, and program products are disclosed for techniques for an automated funding participation blockchain server. In one embodiment, an apparatus includes a processor and a memory coupled to the processor. The memory, in one embodiment, includes code that is executable by the processor to establish a smart contract between a first entity and a second entity, the second entity participating in a partnership with the first entity according to at least one rule defined in the smart contract, monitor a status of the second entity in relation to the terms of the smart contract, generate, using machine learning, at least one recommendation for adjusting the status of the second entity according to the at least one rule defined in the smart contract, and automatically adjust the status of the second entity according to the at least one recommendation.

In one embodiment, the processor is configured to cause the apparatus to train the machine learning on historical training data related to the smart contract.

In one embodiment, the smart contract defines an investment partnership between the first and second entities, the historical training data comprising data associated with the investment partnership.

In one embodiment, the investment partnership comprises an insurance funding arrangement between the first and second entities, the first entity making a lump sum payment and the second entity providing at least a portion of the lump sum payment.

In one embodiment, the status of the second entity comprises a financial status of the second entity, the financial status comprising an asset level, a debt level, a risk level, or a combination thereof.

In one embodiment, the processor is configured to cause the apparatus to determine, using machine learning, a minimum level of participation for the second entity.

In one embodiment, the processor is configured to cause the apparatus to receive a request for a deposit or withdrawal from the second entity, the request associated with an account at the first entity.

In one embodiment, the smart contract comprises at least one rule that is configurable according to the partnership between the first and second entities, the status of the second entity adjusted by configuring the at least one rule.

In one embodiment, the processor is configured to cause the apparatus to automatically, using the machine learning, determine a level of participation for the second entity, based on the partnership terms, and adjust one or more configurable smart contract rules for the determined level of participation.

In one embodiment, the processor is configured to cause the apparatus to generate at least one reward for the second entity participating in the partnership, the at least one reward associated with a participation level for the second entity.

In one embodiment, the at least one reward comprises a cryptocurrency.

In one embodiment, the processor is configured to cause the apparatus to determine an amount of the cryptocurrency using the machine learning, based on an activity level of the second entity.

In one embodiment, the cryptocurrency can be used for participation in the partnership with the first entity.

In one embodiment, the processor is configured to cause the apparatus to adjust the at least one reward to promote or demote participation by the second entity.

In one embodiment, the processor is configured to cause the apparatus to record transactions between the first and second entities on a blockchain server.

In one embodiment, the processor is configured to cause the apparatus to determine, using the machine learning, a participation level for the second entity based on historical data associated with the second entity.

In one embodiment, the processor is configured to cause the apparatus to continuously monitor the status of the second entity and automatically, using the machine learning, execute transactions for preventing an overextended position, the executed transactions recorded on a blockchain server.

In one embodiment, the processor is configured to cause the apparatus to establish a second smart contract for defining payment terms for the second entity.

In one embodiment, a method includes establishing a smart contract between a first entity and a second entity, the second entity participating in a partnership with the first entity according to at least one rule defined in the smart contract, monitoring a status of the second entity in relation to the terms of the smart contract, generating, using machine learning, at least one recommendation for adjusting the status of the second entity according to the at least one rule defined in the smart contract, and automatically adjusting the status of the second entity according to the at least one recommendation.

In one embodiment, an apparatus includes means for establishing a smart contract between a first entity and a second entity, the second entity participating in a partnership with the first entity according to at least one rule defined in the smart contract, means for monitoring a status of the second entity in relation to the terms of the smart contract, means for generating, using machine learning, at least one recommendation for adjusting the status of the second entity according to the at least one rule defined in the smart contract, and means for automatically adjusting the status of the second entity according to the at least one recommendation.

FIG. 1 is a schematic block diagram illustrating one embodiment of a system 100 for an automated insurance agency loan contract funding participation blockchain server. In one embodiment, the system 100 includes one or more information handling devices 102, one or more AFP apparatuses 104, one or more data networks 106, and one or more servers 108. In certain embodiments, even though a specific number of information handling devices 102, AFP apparatuses 104, data networks 106, and servers 108 are depicted in FIG. 1, one of skill in the art will recognize, in light of this disclosure, that any number of information handling devices 102, AFP apparatuses 104, data networks 106, and servers 108 may be included in the system 100.

In one embodiment, the system 100 includes one or more information handling devices 102. The information handling devices 102 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, head phones, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In certain embodiments, the AFP apparatus 104 may include a hardware device such as a secure hardware dongle or other hardware appliance device (e.g., a set-top box, a network appliance, or the like) that attaches to a device such as a head mounted display, a laptop computer, a server 108, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the AFP apparatus 104 may include a power interface, a wired and/or wireless network interface, a graphical interface that attaches to a display, and/or a semiconductor integrated circuit device as described below, configured to perform the functions described herein with regard to the AFP apparatus 104.

The AFP apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the AFP apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the AFP apparatus 104.

The semiconductor integrated circuit device or other hardware appliance of the AFP apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the AFP apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT-F® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102 and may be configured to execute or run machine learning algorithms, programs, applications, processes, and/or the like.

As background, many insurance policies, particularly for businesses, are offered by insurance carriers for a period of time (e.g., one year), and the insurance carriers often require that the premium for the entire period be paid up-front as a lump-sum payment. For cash flow management purposes, many businesses prefer to make smaller periodic payments during the period instead of the up-front, lump-sum payment. This has given rise to businesses that specialize in the financing of those premiums. For example, a premium financier typically pays the up-front, lump-sum payment, and the insured then makes smaller periodic payments (e.g., monthly payments) to the premium financier.

When an insurance premium is financed as discussed above, there can be typically five parties involved: the business or individual who purchases the insurance policy (hereinafter the "insured"), the retail insurance agency, the general insurance agency, the insurance carrier, and the premium financier. When an insured needs insurance coverage, the insured typically contacts a retail insurance agency. The retail agency works directly with the insured to define the insured's insurance requirements, and then solicits estimates for that insurance from general insurance agencies. Typically, it is the general agencies that have established contractual relationships with the insurance carriers. The general agency solicits a policy proposal, including an estimate, from the insurance carrier, and provides it to the retail agency, which in turn provides the estimate to the entity seeking insurance. As discussed above, the insurance carrier typically requires an up-front, lump-sum payment of the insurance premium. Knowing that many businesses and individuals prefer an option of making smaller, periodic payments (e.g., monthly payments) instead of a single up-front, lump-sum payment, the retail agency typically arranges with a premium financier to provide a premium financing option to the insured.

In the event the insured elects to use such a premium financing option, the insured then contracts with the premium financier. The premium financier makes the up-front, lump-sum payment of the premium, and the insured makes smaller periodic payments plus interest to the premium financier. Typically, the premium financier utilizes its own line of credit with a financial institution to make the up-front, lump-sum payment of the insurance premium.

It is important to note that in most instances the amount of interest the premium financier charges the insured is higher than the amount of interest the premium financier is charged by the bank providing the credit line. The difference between two related interest rates is commonly referred to as the spread. The higher the spread, the higher the profit the premium financier stands to gain. This gives rise to three primary levers affecting the amount of revenue the premium financier can make: 1) the amount the premium financier must pay for the capital it is using to fund the loans it is providing to the insureds—the lower the amount, the higher the spread 2) the interest rate the premium financier charges the insured—the higher the interest rate the higher the spread, and 3) the volume of insurance premiums the premium financier finances—the higher the volume the larger the amount of total interest earned through the spread.

It should be apparent to those skilled in the art that within this arrangement two of the three levers affecting the amount of revenue the premium financier can make work against each other. The higher the interest rate the premium financier charges the insured, the less likely the retail agency is to use that particular premium financier, instead opting to use a premium financier offering a lower interest rate. This results in a lower volume of financed premiums. Conversely, the lower the interest rate the premium financier charges, the more likely retail agencies are to use the premium financier to finance the insurance premiums of the retail agencies' customers. This results in a higher volume of financed premiums, but a lower spread on each financed premium. Clearly, a method by which the premium financier can encourage a retail agency to finance its premiums through the premium financier, without having to offer the retail agency severely discounted interest rates, would be highly advantageous for the premium financier.

The solutions described herein address that challenge, providing an apparatus, system, and method for implementing an automated, artificial intelligence ("AI") and blockchain technology based solution that encourages retail agencies to use the services of the premium financier, while also accepting higher interest rates.

Some embodiments of the invention comprise an apparatus, system, and method for utilizing AI and blockchain technology for automating, maximizing the profitability of (for either or both of the premium financier and agency user), and rewarding the agency user for participation in the agency user funding of insurance premium loan contracts.

In the proposed solution, rather than relying entirely on its own funds or line(s) of credit, the premium financier allows a retail insurance agency to provide some portion of the capital required to fund the insurance premiums—agency funding participation ("AFP"). In exchange, the premium financier agrees to pay the retail agency interest on the amount of funds the retail agency provides. The amount of funds the retail agency is permitted to provide (e.g., have on deposit) may be based on the average balance of financed insurance premiums the retail agency maintains with the premium financier.

This provides an incentive for the retail agency to finance more of its customers' insurance premiums with the premium financier. The amount the retail agency is permitted to have on deposit may be controlled manually or may be controlled automatically by an application or module with artificial intelligence ("AI") like attributes. In some embodiments of the invention, a minimum amount of funds may be required to be on deposit as well, such as may be the case in the event the agency has an arrangement with the premium financier to finance higher risk policies with higher risk or unrated carriers, or such as may be the case in the event the agency has drawn against a line-of-credit or other debt facility with the premium financier.

Figure 2:
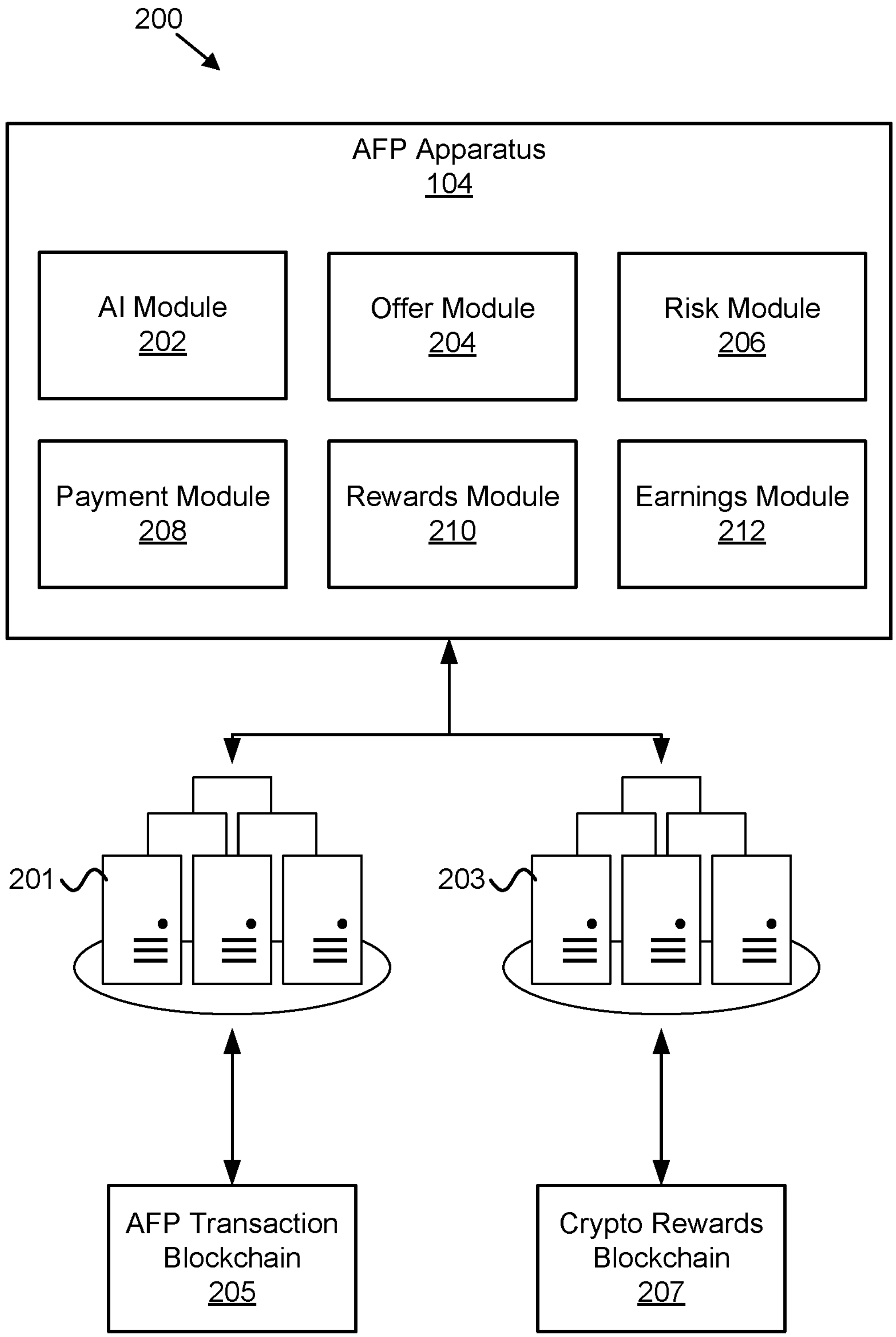
FIG. 2 is a schematic block diagram illustrating one embodiment of an apparatus for techniques for an automated funding participation blockchain server.

FIG. 2 is a block diagram illustrating one embodiment of an apparatus 200 for an automated insurance agency loan contract funding participation blockchain server. In one embodiment, the apparatus 200 includes one embodiment of an AFP apparatus 104. The AFP apparatus 104, in one embodiment, includes one or more of an AI module 202, an offer module 204, a risk module 206, a payment module 208, a rewards module 210, and an earnings module 212, which are described in more detail below.

In one embodiment, the AFP apparatus 104 includes an AI module 202 that monitors the interaction between the agency user's asset and debt levels, considering the risk levels associated with each, and making either recommendations to the premium financier and agency user, or making automated adjustments in conjunction with the blockchain smart contrast rules to maintain the agency user's risk, debt, and asset levels within preset levels or ranges. As used herein, artificial intelligence ("AI") may refer to systems or machines that mimic human intelligence to perform tasks and can iteratively improve themselves based on the information they collect. AI may include the field of machine learning, which focuses on building systems that learn—or improve performance—based on the data they consume by being trained on historical training data to create machine learning models that analyze input data to generate predictions, estimates, forecasts, and/or the like.

The machine learning models discussed herein may be specially-trained models that utilize historical training data associated with a premium financier, a retail agency, the industry generally, similar smart contracts, and/or the like. The AI module 202 may utilize an application programming interface ("API") for access to the trained models, e.g., to provide input to the trained models, to configure the trained models for a particular purpose, and/or the like. The AI module 202 may receive training data various ways, e.g., via an API provided by a program or a user, scraping or crawling internet or other network-based resources, interfacing with a database or other storage system, and/or the like. Th AI module 202 may further monitor the status of the machine learning models, and in response to receiving or detecting new data available, retrain or refresh the machine learning models so that the models are continually trained and refined (e.g., based on a status change of the retail agency, the financier, interest rates, and/or the like).

The interest rate the premium financier pays the retail agency may be fixed or variable and may be related to the average interest rate of the insurance premiums the retail agency has financed through the premium financier (also referred to as the retail agency's portfolio yield), or may be targeted to specific contracts, groups of contracts, premium financier investments, or premium financier investment programs.

The premium financier may use the system to manually, or in an automated manner through the blockchain smart contract rules and AI module 202 rule set, allow the retail agency to make deposits and withdrawals at any time, or may restrict the dates the retail agency can make deposits or withdrawals. The amount of funds allowed to be deposited, how the interest rate is calculated, and the deposit and withdrawal rules, are all variables within the blockchain smart contract and AI module 202 system that can be changed to produce a variety of different configurations for insurance agency contract funding participation.

In one embodiment, the proposed solutions allow the premium financier to change these variables to configure the insurance agency contract funding participation program(s) that will best meet a variety of combinations of the premium financier's needs and the agency user's needs and preferences, and to monitor and change these in an automated fashion utilizing an Agency Funding Participation Blockchain Server ("AFP Blockchain Server") 201.

In one embodiment, the AFP Blockchain Server 201 utilizes blockchain technology to implement automated smart contracts and securely record transactions in a blockchain based ledger system. As used herein, blockchain may refer to a distributed database that is shared among the nodes of a computer network. As a database, a blockchain stores information electronically in digital format. Blockchain may be used for maintaining a secure and decentralized record of transactions. The innovation with a blockchain is that it guarantees the fidelity and security of a record of data and generates trust without the need for a trusted third party.

Further, as used herein, smart contracts may refer to a self-executing contract with the terms of the agreement between buyer and seller being directly written into lines of code. The code and the agreements contained therein exist across a distributed, decentralized blockchain network. The code controls the execution, and transactions are trackable and irreversible. The smart contracts operate according to configurable rules established by the premium financier, and may be changed manually by the premium financier, or by the AI module 202 monitoring AFP Blockchain Server 201 activity and other investment environment conditions (e.g. changes in interest rate levels, AFP and investment account balances, etc.)

In one embodiment, the AI module 202 may also interact with the AI module 202 on the premium financier's Crypto Rewards Blockchain Server 203 to adjust rewards level of AFP investments to further promote or demote participation in certain investments according to participation levels and other preset factors. The AFP Blockchain Server 201 enables agency users to choose the risk vs. reward mix the user agency is comfortable with, such as, but not limited or zero investment targeting and essentially zero risk with a lower interest rate (or investment earnings yield), or targeted investment by risk vs. reward level, account, group, cluster, investment, investment program providing higher interest rate (or investment earnings yield) options with some amount of sharing in potential losses on the selected target(s).

In this manner, targeted investing may increase potential interest rate, but also may open the agency user up to sharing in downside risks (e.g. losses from early cancelations, write-offs, etc.). Utilizing the smart contract rules in conjunction with the AI module 202, the AFP Blockchain Server 201 may activate a "sweep account" feature to automatically move funds to a higher or lower yielding investments (or higher or lower risk level investments) within the selected risk vs. reward mix, employing configurable (by the premium financier) smart contract rules to determine the order of agency user involvement, and amount each agency user may invest, into investments that are accessible by multiple participants, while automatically recording the transactions in the AFP Transaction Blockchain 205 on the AFP Blockchain Server(s) 201.

In one embodiment, utilizing the smart contract rules in conjunction with the AI module 202, the offer module 204 via the AFP Blockchain Server 201 may take into account an agency user's historical and current book of business with the premium financier (including loan portfolio balance, yield, loss rate, and vector and statistical analysis of each), AFP balance, income from other premium financier programs, rewards account balance, and premium financier agency loan products (e.g. agency acquisition loans and working capital loans) balance(s) to automatically determine and make available to the participant appropriate loan product(s) and the available amount(s) of each. Utilizing the smart contract rules in conjunction with the AI module 202, the offer module 204 via the AFP Blockchain Server 201 also considers the amount of the agency user's AFP balance that may serve as a backstop for providing financing to higher risk accounts (e.g., unrated risk retention groups and carriers, special terms, etc.).

In one embodiment, utilizing the smart contract rules in conjunction with the AI module 202, the risk module 206 via the AFP Blockchain Server 201 may employ an automated "loan sweep" function to continuously determine if changes, or attempted changes, in the configuration and amounts of the elements named above results in an over extended position for the account. If it is an attempted change, the risk module 206 via the AFP Blockchain Server 201 prevents the change from occurring and provides the participant with options for being able to achieve the desired objective. If it was a change that was not able to be prevented by the risk module 206 via the AFP Blockchain Server 201, the risk module 206 via the AFP Blockchain Server 201 prevents the agency user from withdrawing any funds or transferring funds in a manner that doesn't alleviate the overextension of funds. If the agency user doesn't act within allocated time, the risk module 206 via the AFP Blockchain Server 201 automatically moves funds from an AFP deposit or AFP investment account(s) to eliminate the overextended position. The loan sweep function employs configurable (by the premium financier) smart contract rules to enforce the loan sweep function, and automatically executes the transactions and records them in the AFP Transaction Blockchain 205 on the distributed AFP Blockchain Server(s) 201.

In one embodiment, utilizing the smart contract rules in conjunction with the AI module 202, the payment module 208 via the AFP Blockchain Server 201 allows a participant to configure a "Payment Preferences" smart contract. The payments can be calculated and paid on selected periodicity (daily, weekly, monthly, quarterly, etc.), can be directed into account(s) as desired such as, but not limited to, AFP deposit account, cash, converted and deposited into a supported crypto currency account, pay down a loan account, converted to the premium financier's rewards points or cryptographic currency-based rewards, withdrawn or transferred via ACH or other electronic transfer protocol to a third-party account, and any combination thereof, and can be configured on an investment account by investment account basis.

In another embodiment of the proposed solution, the smart contract rules in conjunction with the AI module 202 of the AFP Blockchain Server 201 may interact with the cryptographic currency based rewards program blockchain server (the Crypto Rewards Blockchain Server 203) via the rewards module 210. The Crypto Rewards Blockchain Server 203 utilizes blockchain technology, e.g., the Crypto Rewards Blockchain 207 or a different blockchain, to implement automated smart contracts and securely record transactions in a blockchain based ledger system.

In one embodiment, the smart contracts operate according to configurable rules established by the premium financier, and may be changed by the premium financier, by the AFP apparatus 104, by the rewards module 210, or by an artificial intelligence-based application, e.g., the AI module 202, monitoring and controlling the Crypto Rewards Blockchain Server 203 activity (the Crypto Rewards AI, or, "CRAI").

In one embodiment, the CRAI monitors Crypto Rewards Blockchain Server 203 activity, AFP investment levels, and other rewards market and crypto market related parameters, such as, but not limited to changes in reward item prices, and changes in crypto exchange rates. The CRAI may also interact with the AI module 202 on the AFP Blockchain Server 201 to adjust rewards level of AFP investments to further promote or demote participation in certain investments according to participation levels and other preset factors.

In one embodiment, utilizing the smart contract rules in conjunction with the CRAI, the rewards module 210 via the Crypto Rewards Blockchain Server 203 may issue, redeem, and exchange the premium financier's cryptographic currency based rewards currency virtual coins (the "Crypto Rewards Coins"), automatically recording all transactions involving Crypto Rewards Coins on the Crypto Rewards Blockchain Server's blockchain 207. The Crypto Rewards Coins may be CPF's own proprietary digital currency and blockchain or may be a digital currency issued by a third-party. In the event a third-party crypto currency is utilized, select transactions may also be recorded on the currency's public blockchain.

In one embodiment, agency users may receive Crypto Rewards Coins for funding premium finance loans through the premium financier, achieving certain levels of annual originations or loan portfolio average outstanding balances, achieving and maintaining certain annual loan portfolio yields, utilizing certain terms or rate charts, achieving and maintaining certain low cancelation levels, achieving and maintaining certain low write-off levels, certain Agency Funding Participation activity, utilizing other premium financier loan products (e.g. agency acquisition loans and working capital loans), cash (via a direct purchase), or any other activity the premium financier desires to promote and encourage.

In one embodiment, the amount of Crypto Rewards an agency user receives for certain activities may be set and adjusted manually by the premium financier, or automatically by CRAI, based on achieving certain levels of annual originations or loan portfolio average outstanding balance, achieving and maintaining certain annual loan portfolio yields, utilizing certain terms or rate charts, achieving and maintaining certain low cancelation levels, achieving and maintaining certain low write-off levels, certain Agency Funding Participation activity, utilizing other CPF loan products (e.g. agency acquisition loans and working capital loans), or any other number of agency user activities on the AFP Blockchain Server 201 system, interactions with the premium financier, agency user account parameters, or any combination thereof.

In one embodiment, agency users may redeem Crypto Rewards Coins for premium financier funded activities, premium financier funded travel packages, premium financier funded event tickets, attending special premium financier sponsored activities, unlocking special rates or rate chart(s), buying down rate for a customer loan or agency loan, cash, other supported cryptographic currencies, other rewards points with participating partners, or other benefit to the agency user. Agency users may redeem the Crypto Rewards Coins manually through the premium financier's representative, or automatically by CRAI, with all redemption transactions being automatically recorded on the Crypto Rewards Server's blockchain.

In one embodiment, upon reaching a certain amount of Crypto Rewards Coins, agency users may automatically receive bonus items from the premium financier, such as, but not limited to premium financier funded activities, premium financier funded travel packages, premium financier funded event tickets, attending special premium financier sponsored activities, unlocking special rates or rate chart(s), and receiving special rates for agency loan products.

In one embodiment, the earnings module 212 automatically rolls all, or a portion of, earnings into an agency's AFP account. The earnings are typically generated by commissions the agency user earns through various premium financier programs, such as adding points onto premium financier loans the agency user is facilitating for its customers, sharing in the float income agency user facilitated loans are generating for the premium financier, sharing in the late fee revenue generated by the agency user facilitated loans, sharing in the overall profits of the portfolio of loans facilitated by the agency user, and/or commissions for business referred to the premium financier for referred business.

In one embodiment, the amount of the agency user's earnings being rolled into the agency user's account is an additional variable the AI module 202 will track, monitor, and forecast the future amount—essentially calculating a present value for it utilizing a combination of traditional present value calculations combined with AI machine learning algorithms—and taking into account that present value along with all the other factors it is monitoring to determine and make available to the agency user appropriate loan product(s) and the available amount(s) of each, and implement both the interest rate maximization and loan risk mitigating sweep mechanisms.

The amount of earnings being rolled into the agency user's AFP account, and the present value of future earnings to be rolled into it, may also be additional variables taken into account by the Crypto Rewards Blockchain Server 203 and its associated Crypto Rewards AI, as it determines the amount of Crypto Rewards Coins to issue, and other special offers and rewards.

Figure 3:
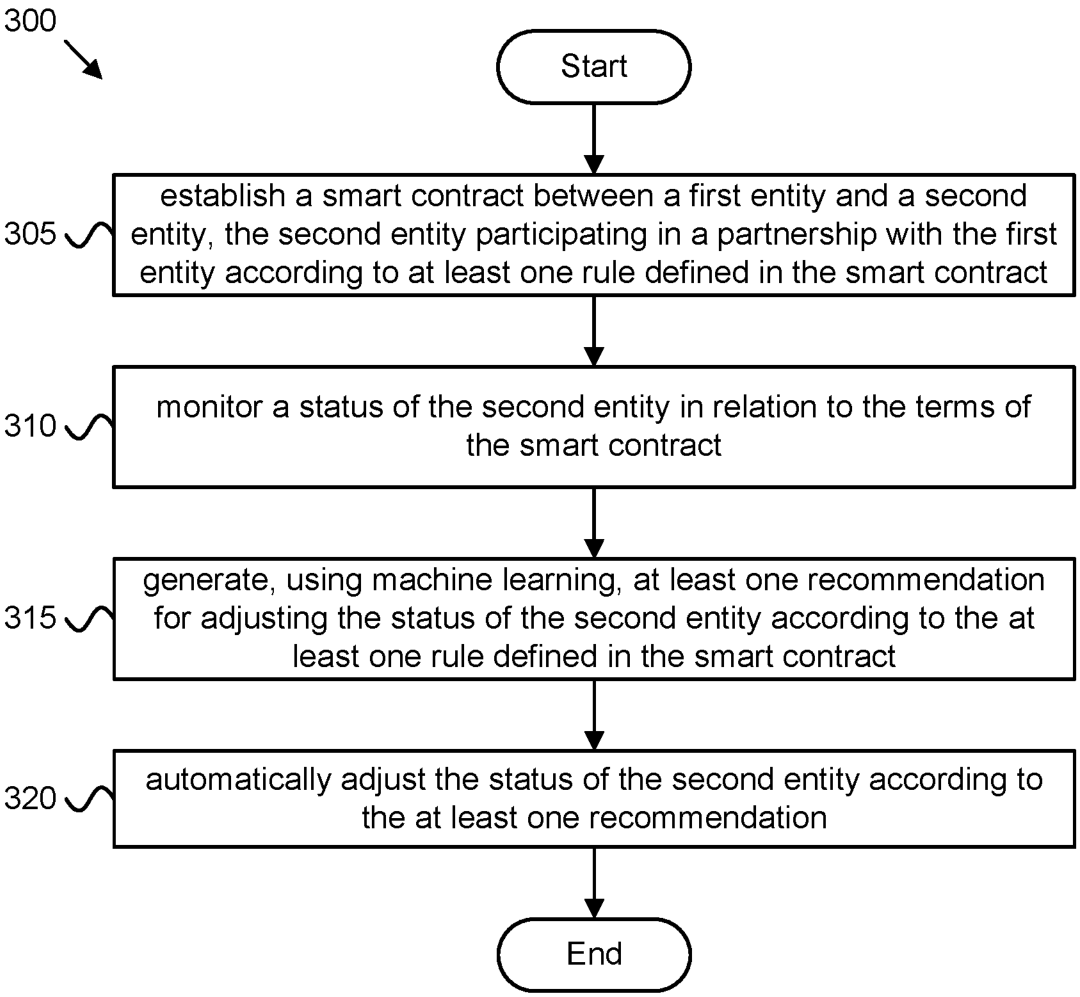
FIG. 3 is a schematic flow chart diagram illustrating one embodiment of a method for techniques for an automated funding participation blockchain server.

FIG. 3 depicts a schematic flow chart diagram illustrating one embodiment of a method for techniques for an automated funding participation blockchain server The method 300, in one embodiment, may be performed by an AFP apparatus 104, an AI module 202, an offer module 204, a risk module 206, a payment module 208, a rewards module 210, an earnings module 212, an AFP transaction blockchain 205, a crypto rewards blockchain 207, an information handling device 102, a server 108, and/or the like.

In one embodiment, the method 300 begins and establishes 305 a smart contract between a first entity and a second entity, the second entity participating in a partnership with the first entity according to at least one rule defined in the smart contract. In one embodiment, the method 300 monitors 310 a status of the second entity in relation to the terms of the smart contract.

In one embodiment, the method 300 generates 315, using machine learning, at least one recommendation for adjusting the status of the second entity according to the at least one rule defined in the smart contract. In one embodiment, the method 300 automatically adjusts 320 the status of the second entity according to the at least one recommendation, and the method 300 ends.

Means for performing the various steps described herein, in various embodiments, may include one or more of an information handling device 102, a server 108, an AFP apparatus 104, an AI module 202, an offer module 204, a risk module 206, a payment module 208, a rewards module 210, an earnings module 212, an AFP transaction blockchain 205, a crypto rewards blockchain 207, an AFP blockchain server 201, a crypto rewards blockchain server 203, a network interface, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for performing one or more of the steps described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:

a processor; and a memory coupled to the processor, the memory storing code that is executable by the processor to cause the apparatus to:

deploy, on a blockchain server, self-executing code of a smart contract between a first entity and a second entity, wherein the self-executing code of the smart contract defines at least one configurable rule governing a financial participation status of the second entity in a partnership with the first entity, the at least one configurable rule defining a participation threshold;

monitor the financial participation status of the second entity in relation to the participation threshold, wherein the financial participation status is determined based on financial data comprising at least one of asset levels, debt levels, or transaction performance recorded on a blockchain ledger of the blockchain server;

generate, using a machine learning model trained on historical financial participation data, at least one recommendation for adjusting the participation threshold, wherein the machine learning model is iteratively retrained, in response to detection of new transaction data committed to the blockchain ledger, on the new transaction data such that the machine learning model is refined based on the on-chain transaction data over time;

in response to determining, based on the at least one recommendation, that an attempted transaction associated with the second entity would cause the financial participation status to exceed the participation threshold, automatically modify the at least one configurable rule of the self-executing code of the smart contract via the blockchain server, before the attempted transaction is committed to the blockchain ledger, to prevent execution of the attempted transaction on the blockchain ledger; and automatically execute, via the modified self-executing code of the smart contract on the blockchain server, a corrective on-chain transaction that adjusts the financial participation status to within the participation threshold, the corrective on-chain transaction being recorded on the blockchain ledger.

2. The apparatus of claim 1, wherein the processor is configured to cause the apparatus to train the machine learning on historical training data related to the smart contract.

3. The apparatus of claim 2, wherein the smart contract defines an investment partnership between the first and second entities, the historical training data comprising data associated with the investment partnership.

4. The apparatus of claim 3, wherein the investment partnership comprises an insurance funding arrangement between the first and second entities, the first entity making a lump sum payment and the second entity providing at least a portion of the lump sum payment.

5. The apparatus of claim 1, wherein the status of the second entity comprises a financial status of the second entity, the financial status comprising an asset level, a debt level, a risk level, or a combination thereof.

6. The apparatus of claim 1, wherein the processor is configured to cause the apparatus to determine, using machine learning, a minimum level of participation for the second entity.

7. The apparatus of claim 1, wherein the processor is configured to cause the apparatus to receive a request for a deposit or withdrawal from the second entity, the request associated with an account at the first entity.

8. The apparatus of claim 1, wherein the smart contract comprises at least one rule that is configurable according to a partnership between the first and second entities, the status of the second entity adjusted by configuring the at least one rule.

9. The apparatus of claim 1, wherein the processor is configured to cause the apparatus to automatically, using the machine learning, determine a level of participation for the second entity, based on partnership terms, and adjust one or more configurable smart contract rules for the participation level.

10. The apparatus of claim 1, wherein the processor is configured to cause the apparatus to generate at least one reward for the second entity participating in a partnership, the at least one reward associated with a participation level for the second entity.

11. The apparatus of claim 10, wherein the at least one reward comprises a cryptocurrency.

12. The apparatus of claim 11, wherein the processor is configured to cause the apparatus to determine an amount of the cryptocurrency using the machine learning, based on an activity level of the second entity.

13. The apparatus of claim 11, wherein the cryptocurrency can be used for participation in a partnership with the first entity.

14. The apparatus of claim 10, wherein the processor is configured to cause the apparatus to adjust the at least one reward to promote or demote participation by the second entity.

15. The apparatus of claim 1, wherein the processor is configured to cause the apparatus to record transactions between the first and second entities on a blockchain server.

16. The apparatus of claim 1, wherein the processor is configured to cause the apparatus to determine, using the machine learning, a participation level for the second entity based on historical data associated with the second entity.

17. The apparatus of claim 1, wherein the processor is configured to cause the apparatus to continuously monitor the status of the second entity and automatically, using the machine learning, execute transactions for preventing an overextended position, the executed transactions recorded on a blockchain server.

18. The apparatus of claim 1, wherein the processor is configured to cause the apparatus to establish a second smart contract for defining payment terms for the second entity.

19. A method, comprising:

deploying, on a blockchain server, self-executing code of a smart contract between a first entity and a second entity, wherein the self-executing code of the smart contract defines at least one configurable rule governing a financial participation status of the second entity in a partnership with the first entity, the at least one configurable rule defining a participation threshold;

monitoring the financial participation status of the second entity in relation to the participation threshold, wherein the financial participation status is determined based on financial data comprising at least one of asset levels, debt levels, or transaction performance recorded on a blockchain ledger of the blockchain server;

generating, using a machine learning model trained on historical financial participation data, at least one recommendation for adjusting the participation threshold, wherein the machine learning model is iteratively retrained, in response to detection of new transaction data committed to the blockchain ledger, on the new transaction data such that the machine learning model is refined based on the on-chain transaction data over time;

in response to determining, based on the at least one recommendation, that an attempted transaction associated with the second entity would cause the financial participation status to exceed the participation threshold, automatically modifying the at least one configurable rule of the self-executing code of the smart contract via the blockchain server, before the attempted transaction is committed to the blockchain ledger, to prevent execution of the attempted transaction on the blockchain ledger; and automatically executing, via the modified self-executing code of the smart contract on the blockchain server, a corrective on-chain transaction that adjusts the financial participation status to within the participation threshold, the corrective on-chain transaction being recorded on the blockchain ledger.

20. A computer program product comprising a non-transitory computer readable storage medium storing code, the code being configured to be executable by a processor to perform operations comprising:

deploying, on a blockchain server, self-executing code of a smart contract between a first entity and a second entity, wherein the self-executing code of the smart contract defines at least one configurable rule governing a financial participation status of the second entity in a partnership with the first entity, the at least one configurable rule defining a participation threshold;

monitoring the financial participation status of the second entity in relation to the participation threshold, wherein the financial participation status is determined based on financial data comprising at least one of asset levels, debt levels, or transaction performance recorded on a blockchain ledger of the blockchain server;

generating, using a machine learning model trained on historical financial participation data, at least one recommendation for adjusting the participation threshold, wherein the machine learning model is iteratively retrained, in response to detection of new transaction data committed to the blockchain ledger, on the new transaction data such that the machine learning model is refined based on the on-chain transaction data over time;

in response to determining, based on the at least one recommendation, that an attempted transaction associated with the second entity would cause the financial participation status to exceed the participation threshold, automatically modifying the at least one configurable rule of the self-executing code of the smart contract via the blockchain server, before the attempted transaction is committed to the blockchain ledger, to prevent execution of the attempted transaction on the blockchain ledger; and automatically executing, via the modified self-executing code of the smart contract on the blockchain server, a corrective on-chain transaction that adjusts the financial participation status to within the participation threshold, the corrective on-chain transaction being recorded on the blockchain ledger.

* * * * *